July 12, 1938.  V. H. WILSHIRE  2,123,760
LAMINATED PAPER
Filed June 16, 1934

Inventor
Van Hamm Wilshire
Maréchal & Noe
Attorney

Patented July 12, 1938

2,123,760

UNITED STATES PATENT OFFICE 2,123,760

LAMINATED PAPER

Van Hamm Wilshire, Dayton, Ohio, assignor to The Specialty Papers Company, Dayton, Ohio, a corporation of Ohio Application June 16, 1934, Serial No. 730,851

8 Claims. (Cl. 154—50)

This invention relates to laminated paper material.

One object of the invention is the provision of a laminated sheet of material built up from a sheet of highly calendered greaseproof paper and a wax absorbent paper held thereto by an intermediate layer of wax, and of such construction as to be particularly adapted for use as a container in which the flavor of edible food products containing volatile oils or the like is to be preserved.

Another object of the invention is the provision of a waterproof and greaseproof laminated material especially useful in preserving edibles containing volatile oils and for similar uses, and embodying a sheet of glassine paper and a thicker sheet of wax absorbent paper held together by an intermediate layer of wax, and having surface coatings of wax on opposite sides.

Another object of the invention resides in the method of making such laminated material.

Other objects and advantages of the invention will be apparent from the following description, the appended claims and accompanying drawing, in which,—

Figure 1:
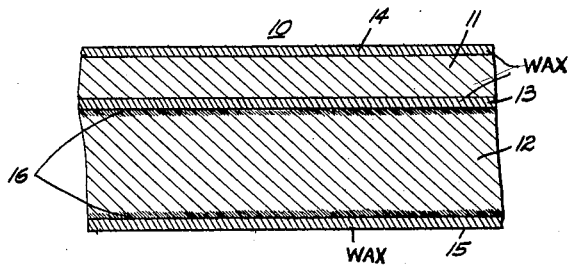
Fig. 1 is a sectional view on a greatly enlarged scale, showing the laminated material of the present invention.

Referring more particularly to the drawing by reference numerals, 10 generally designates a laminated sheet of material as shown more particularly in Fig. 1, which is drawn to a greatly enlarged scale, the material 10 comprising a sheet of greaseproof paper 11 which is held to a sheet of wax absorbent paper 12 by an intermediate thin layer 13 of wax. One or both sides of the material 10 are provided with a surface coating or coatings of wax as indicated at 14 and 15.

The sheet of greaseproof paper 11 is a glazed finish substantially transparent piece of thin paper made from pulp that has been very extensively beaten and thoroughly hydrated and then super-calendered. Such a sheet is known as glassine paper, this paper being practically non-absorbent of paraffin and other wax and oils. A sheet that weighs about 20 pounds to a ream of 24" x 36" sheets is quite satisfactory for the purpose.

The sheet 12 is a wax absorbent paper, preferably considerably bulkier or thicker than the glassine sheet, and may for example weigh about 50 pounds to a ream of 24" x 36" sheets, although the weight or thickness may be somewhat greater or less than this dependent on the particular service required. This sheet is preferably a calendered or high finish sulphite opaque paper capable of taking up some wax which is absorbed for some distances into the surface of the paper as indicated at 16. The two sheets 11 and 12 are held together by a layer of paraffin. The surface layer 14 on the glassine sheet is a comparatively thin continuous coating of paraffin, and the outer layer 15 on the sheet 12 is also a continuous coating of paraffin, preferably somewhat thicker than the coating 14.

A sheet of calendered high finish sulphite paper which weighs 50 pounds per ream of 24" x 36" sheets has a thickness of about .0035", and a sheet of glassine paper weighing 20 pounds per ream of 24" x 36" is .001" thick. The standard number of sheets in a ream, for wrapping paper, is 480. The two-ply sheet has a thickness of about .0052".

Figure 2:
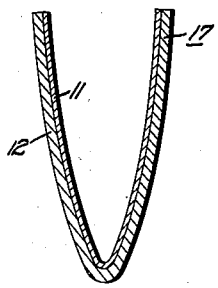
Fig. 2 is a sectional view through a portion of a container constructed of the laminated material.

The laminated material 10 is especially adapted for container use for edibles and more particularly for edibles such as gelatine-like dessert powders or other edibles and similar products containing volatile oils which should be preserved in order to retain the flavor and aroma of the original product over a long period of time. The material 10 is preferably used as a bag 17 a portion of which is shown in Fig. 2, with the glassine sheet 11 inside and the wax absorbent sheet 12 on the outer side, as shown. It has been demonstrated that the contents of such a bag may be kept substantially in their original form over very extended periods of time without losing any considerable portion of their original essential oils. The material, moreover excludes extraneous undesirable odors, flavors or aromas from the packaged product. The inside wax layer 14 immediately prevents passage of moisture and is effective in sealing the sides of the bag together at the filling end. The layers 13 and 15 likewise prevent water or moisture from obtaining access to the edible food products in the bag from the outside. The greaseproof paper 11 effectively resists any loss of the volatile oil constituents of the food product which would otherwise penetrate and be absorbed by the sheet 12. The comparatively bulky or thick sheet of paper 12 gives adequate strength to the material particularly at the crease lines and reinforces and protects the quite thin sheet 11 which by itself would not be strong enough for the purpose at the crease lines.

Moreover the thicker bulkier sheet 12 of the wax absorbent character permits of a layer of substantial thickness of wax between the sheets 11 and 12 and a layer of adequate thickness on the outer exposed side of the sheet 12 to effectively prevent the entrance of moisture into the container. The material moreover is quite low in cost, and readily made and handled.

The total wax content of a laminated sheet construction in accordance with this invention is about 18 pounds in a ream, so it will be seen that the weight of the wax approximately corresponds to the weight of the glassine sheet while the weight of the wax absorbent sheet substantially exceeds the combined weight of the wax and the glassine sheet. An excessive amount of wax, however, is not absorbed into the sheet 12 as the wax is confined more or less on and in the surface of this sheet because of its comparatively smooth or calendered surface.

Figure 3:
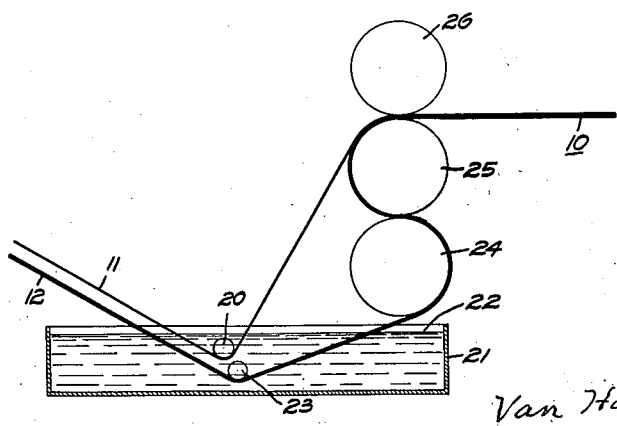
Fig. 3 is a diagrammatic view showing how the material is made.

The laminated material may be made preferably in accordance with the process that has been diagrammatically illustrated in Fig. 3. The glassine sheet 11 is supplied under a submerging roll 20 in a paraffin tank 21, the paraffin level being indicated at 22. As the sheet travels rapidly through the hot paraffin bath it is given a continuous but comparatively thin surface coating on both sides. The paraffin wax, however, is not impregnated into the paper but merely applied to its outer surfaces, due to the greaseproof character of the sheet. The sheet 12 of wax absorbent paper is supplied under a submerging roll 23 and then passes around heated rolls 24 and 25 as illustrated in Fig. 3. The rolls 24 and 25 are effective in limiting the amount of wax on the surfaces of the sheet 12 and in causing some slight impregnation of the wax coating applied by the paraffin bath. The two sheets 11 and 12 are brought into contact just before they pass through the nip of the cooperating rolls 25 and 26, the roll 26 being held down under suitable pressure toward the roll 25 so that the two sheets are firmly pressed together and the upper surface coating on sheet 12 united to the lower surface coating on sheet 11 while the wax is hot, and all air is excluded from between the sheets as the sheets pass between these rolls. The sheet 10 is then taken from between the rolls 25 and 26 and passed under suitable cooling rolls.

While the method herein described, and the form of apparatus for carrying this method into effect constitute preferred embodiments of the invention, it is to be understood that the invention is not limited to this precise method and form of apparatus, and that changes may be made in either without departing from the scope of the invention which is defined in the appended claims.

What is claimed is:

1. A waterproof and greaseproof laminated pliable paper material which can be readily folded and especially adapted for container use for preserving the flavor of edible food products containing volatile oils, comprising a sheet of glassine paper and a thicker sheet of smooth finish wax absorbent paper of a weight of the order of 50 pounds or less per ream of 24" x 36" per sheet held to the glassine sheet merely by an intermediate layer of wax which is also absorbed for some distance into the wax absorbent paper, the laminated material having a surface coating of wax applied directly to the glassine sheet.

2. A waterproof and greaseproof laminated pliable paper material which can be readily folded and adapted for use in contact with edibles, comprising a thin sheet of substantially greaseproof paper and a thicker sheet of smooth finish wax absorbent paper of a weight of the order of 50 pounds or less per ream of 24" x 36" per sheet held to the first sheet merely by an intermediate layer of paraffin, both sheets having a surface coating of paraffin, the wax absorbent paper having paraffin absorbed therein.

3. A waterproof and greaseproof laminated pliable paper material which can be readily folded and especially adapted for use in contact with edibles containing volatile oils, comprising a sheet of glassine paper, a thicker sheet of smooth finish wax absorbent paper of a weight of the order of 50 pounds or less per ream of 24" x 36" per sheet held to the glassine sheet merely by an intermediate layer of paraffin, the glassine sheet having a surface coating of paraffin on its exposed side and the wax absorbent sheet having a coating of paraffin on its exposed side and absorbed for some distance into the wax absorbent sheet.

4. A pliable laminated paper container for edibles comprising an inner sheet of super-calendered substantially transparent greaseproof paper and a thicker outer opaque sheet of smooth finish wax absorbent paper of a weight of the order of 50 pounds or less per ream of 24" x 36" per sheet held to the inner sheet merely by an intermediate layer of paraffin and containing paraffin absorbed therein, the container having a paraffin coating on both the inner and outer sides thereof.

5. A waterproof and greaseproof laminated pliable paper material adapted for use as a container in contact with edibles, comprising a thin sheet of substantially greaseproof paper and a thicker flexible sheet of wax absorbent paper of a weight of the order of 50 pounds or less per ream of 24" x 36" per sheet held to the first sheet by an intermediate layer of paraffin which also extends into the body of the wax absorbent sheet, a surface coating of wax applied directly on the outer side of the thin sheet, and a coating of paraffin on the outer side of the wax absorbent sheet and extending into the body of the wax absorbent sheet.

6. A waterproof and greaseproof laminated pliable paper material adapted for use as a food container, comprising a thin sheet of substantially greaseproof paper and a thicker flexible sheet of wax absorbent paper of a weight of the order of 50 pounds or less per ream of 24" x 36" per sheet held to the first sheet merely by an intermediate layer of paraffin which also extends into the body of the wax absorbent sheet, a surface coating of paraffin applied directly on the outer side of said thin sheet and a coating of paraffin on the outer side of the wax absorbent sheet and extending into the body of the wax absorbent sheet, the amount of paraffin contained in the laminated material substantially equaling the weight of said thin sheet.

7. A composite pliable sheet of paper which can be readily folded and which is adapted for use as a food container, comprising a thin sheet of substantially greaseproof paper and a thicker flexible sheet of smooth finish wax absorbent paper of a weight of 50 pounds or less per ream of 24" x 36" per sheet held to the first sheet merely by an intermediate layer of paraffin and having paraffin impregnated therein to a degree sufficient to render the wax absorbent paper substantially waterproof, and a surface coating of paraffin on the outer side of the wax absorbent paper.

8. A flexible composite two-ply sheet of paper which can be readily folded and which is substantially greaseproof and moistureproof and which is adapted for use as a food container, comprising a thin sheet of substantially greaseproof supercalendered transparent paper and a thicker flexible sheet of smooth finish wax absorbent paper of a weight of the order of 50 pounds or less per ream of 24" x 36" per sheet held to the first sheet merely by an intermediate layer of paraffin and having a substantial amount of paraffin impregnated into the body of the wax absorbent sheet and a surface coating of paraffin on the outer side of the wax absorbent sheet of paper.

VAN HAMM WILSHIRE.